Oct. 29, 1968  C. R. FEGLEY  3,407,949
APPARATUS FOR CYCLICALLY LOADING AND UNLOADING
A PAIR OF ARTICLE CARRIERS
Filed March 8, 1967  6 Sheets-Sheet 1
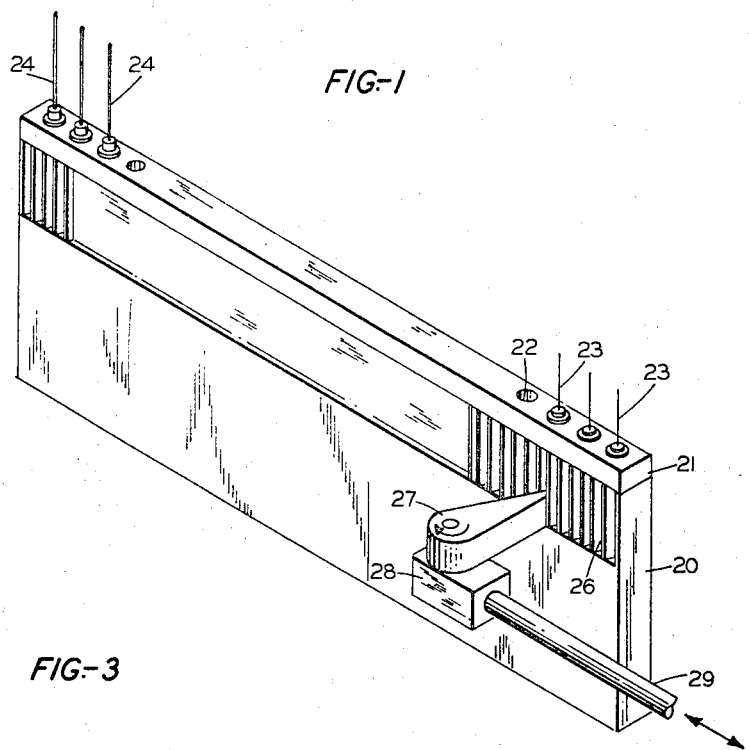
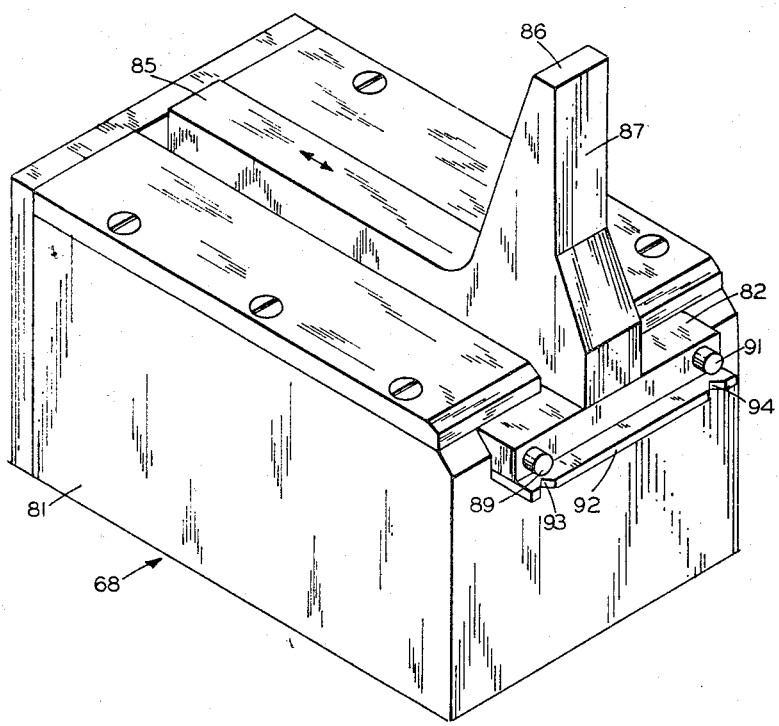
INVENTOR
C.R. FEGLEY
By R. P. Miller
ATTORNEY Oct. 29, 1968  C. R. FEGLEY  3,407,949
APPARATUS FOR CYCLICALLY LOADING AND UNLOADING
A PAIR OF ARTICLE CARRIERS
Filed March 8, 1967  6 Sheets-Sheet 2

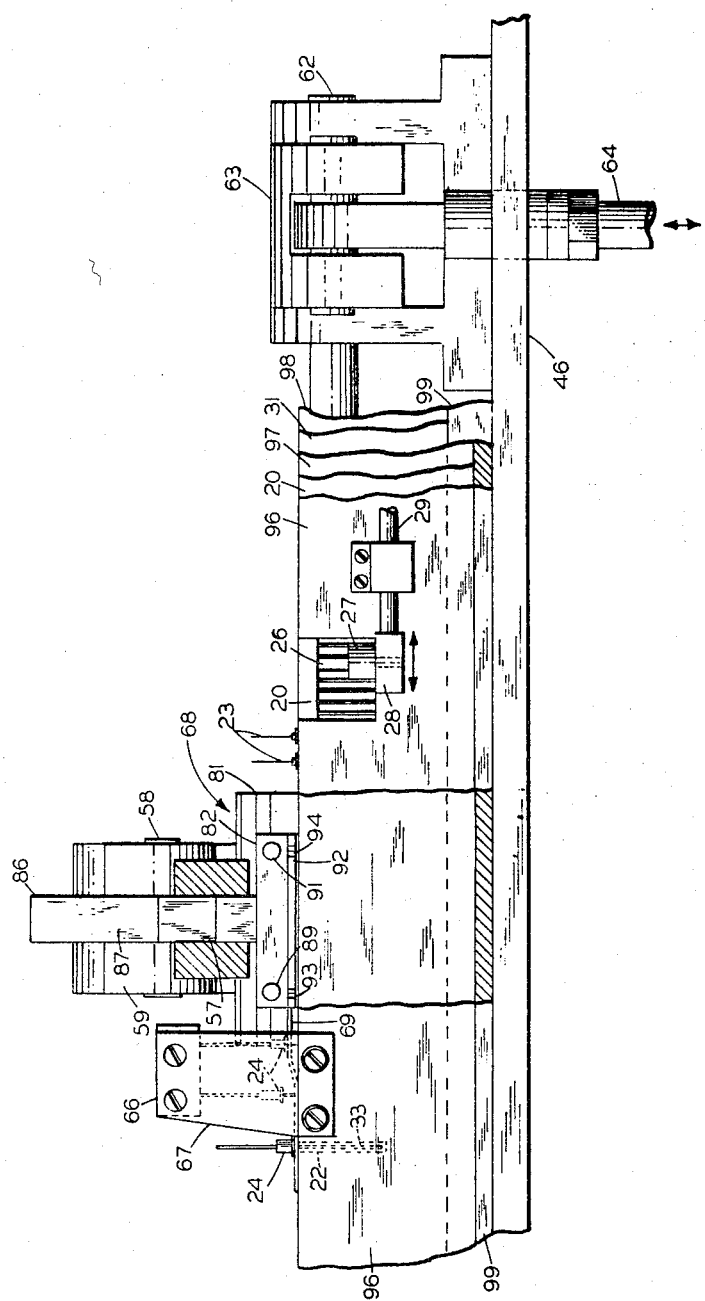

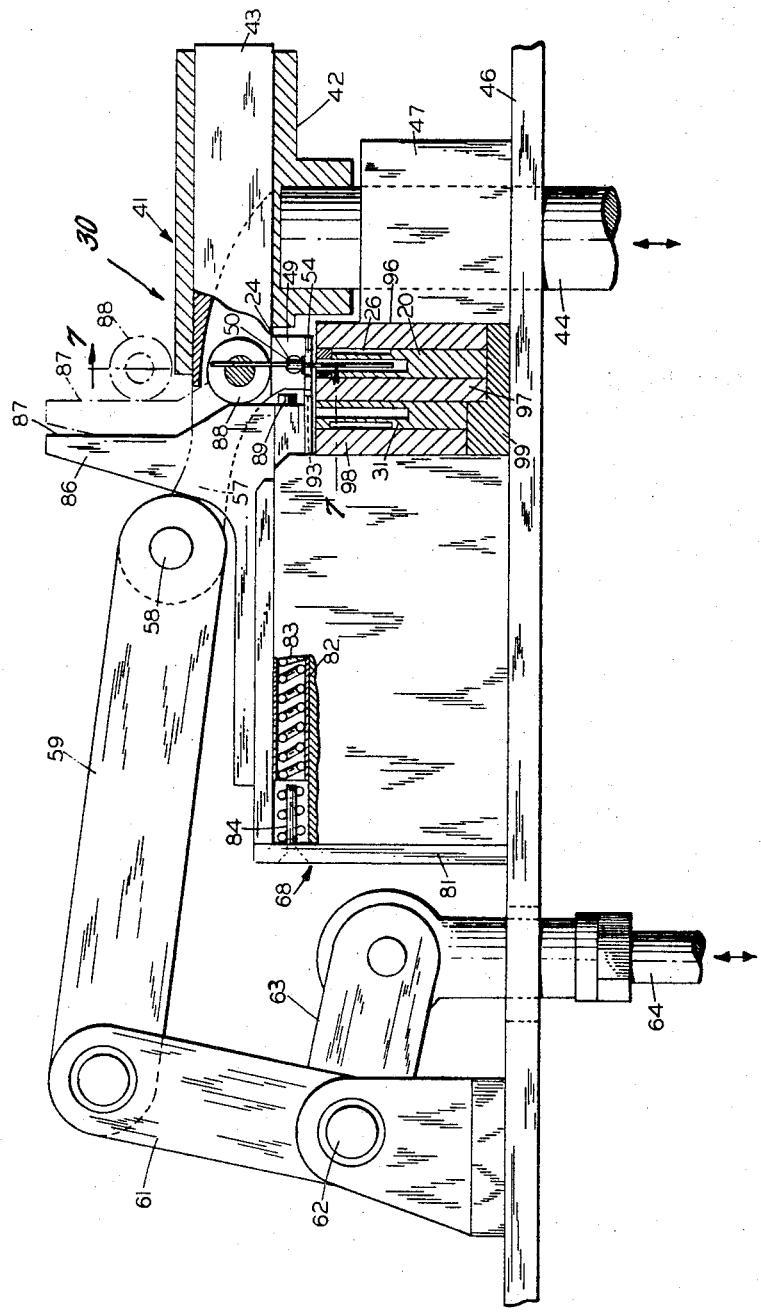

Oct. 29, 1968 C. R. FEGLEY 3,407,949
APPARATUS FOR CYCLICALLY LOADING AND UNLOADING
A PAIR OF ARTICLE CARRIERS
Filed March 8, 1967 6 Sheets-Sheet 5

Oct. 29, 1968   C. R. FEGLEY   3,407,949
APPARATUS FOR CYCLICALLY LOADING AND UNLOADING
A PAIR OF ARTICLE CARRIERS
Filed March 8, 1967   6 Sheets-Sheet 6
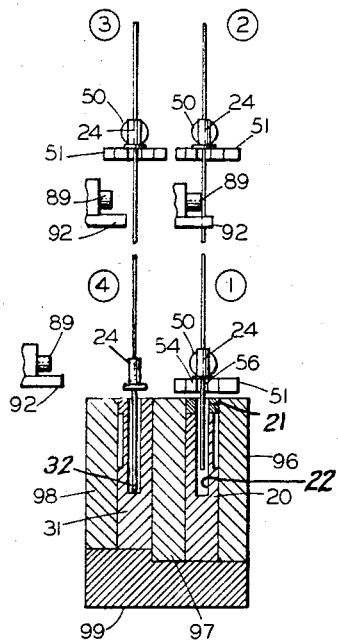
FIG.-9
FIG.-10
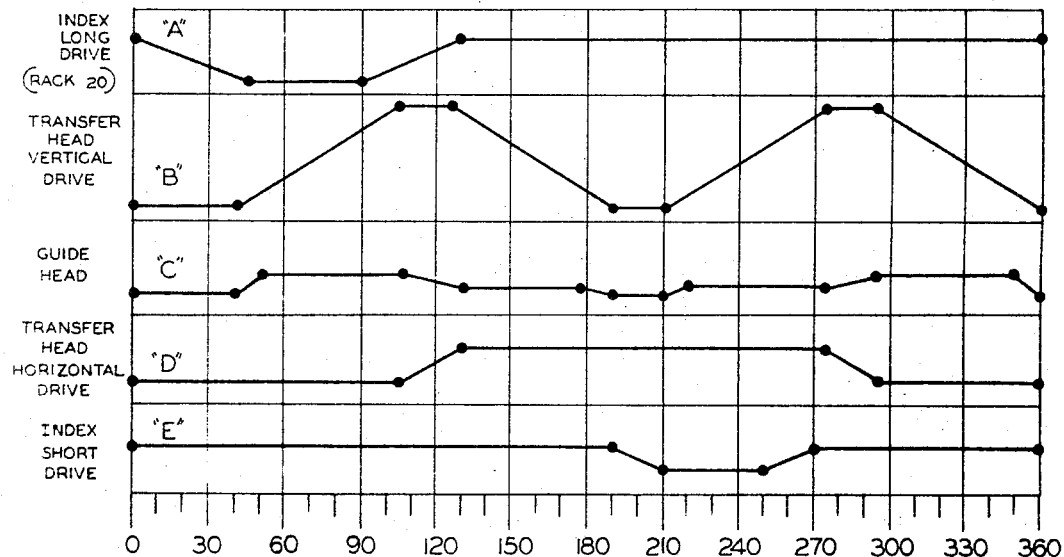

United States Patent Office 3,407,949
Patented Oct. 29, 1968

3,407,949
APPARATUS FOR CYCLICALLY LOADING AND UNLOADING A PAIR OF ARTICLE CARRIERS
Charles R. Fegley, Laureldale, Pa., assignor to Western Electric Company, Incorporated, New York, N.Y., a corporation of New York
Filed Mar. 8, 1967, Ser. No. 621,698
12 Claims. (Cl. 214—309)

ABSTRACT OF THE DISCLOSURE

A transfer head cylically reciprocates between a pair of racks, each containing an aligned group of articles. Upon each movement of the head, an article is lifted from a first rack, transferred and deposited in the other rack, after which the rack is moved transversely of the head to remove the deposited article from the head while advancing another article into the head for subsequent lifting, transferring and depositing in the first rack.

Background of the invention

In order to economically manufacture various devices, such as semiconductor diodes, various automatic fabricating and assembling facilities must be utilized. Such facilities require a continuous supply of unfabricated components as well as means to receive and transport the completed devices. It would be expeditious to continuous operations in these automated facilities if mechanisms could be provided to unload unfabricated components from a supply holder or rack while at the same time completely fabricated devices could be loaded into empty sections of the supply holder. Further, such mechanisms must operate in a positive fashion without any lost motion, such as returning the mechanism to a base start position following a loading or unloading operation.

Summary of the invention

The present invention contemplates a new and improved machine or apparatus that cyclically unloads partially fabricated devices from a supply holder and then loads completely fabricated devices into the vacated sections of the supply holder. As an example, a supply holder may comprise a carrier rack supporting a supply of aligned, partially fabricated diodes which are successively indexed into the unloading and loading machine. As the rack is indexed, the leading unfabricated diode is advanced and held by a magnet and jaw on a transfer head, whereafter the head is moved to lift, transfer and deposit the diode in a second carrier rack which is subsequently advanced to move the diode from the jaw and into a series of fabricating machines. At this time, a completely fabricated diode is advanced into engagement with a second magnet and jaw on the transfer head whereafter the transfer head is again moved to lift, transfer and deposit the completed diode into a vacated section of the first rack. During each transfer and deposit of a fabricated or an unfabricated diode, a magnetic guide head is moved under the control of the transfer head to guide the diodes into the respective racks. In summary, each complete cycle of operation of the transfer machine results in (1) a transfer of an unfabricated diode from the first supply rack into the second supply rack and (2) a transfer of a completely fabricated diode from the second rack into a second section of the first supply rack.

Brief description of the drawing

The advantages of the present invention will be apparent upon consideration of the following detailed description when considered in conjunction with the accompanying drawings wherein:

FIG. 1 is a perspective view of a supply rack, showing both cased and uncased diodes together with a showing of a mechanism for indexing the rack;

FIG. 3 is a perspective view of a head for guiding diodes being inserted in a rack;

FIG. 4 is a sectional view taken along line 4—4 of FIG. 2 showing facilities for lifting and positioning cased diodes to be transferred from a first rack into a second rack together with a further showing of the guide head shown in FIG. 3;

FIG. 5 is the side elevational view, partially in section and partially cut away, illustrating the structural relationships of the transfer head and the guide head with respect to the first and second racks together with a showing of the mechanisms for operating the transfer head and the guide head;

FIG. 9 is a schematic view showing the movement of a diode during transfer with respect to a magnet on the transfer head and a magnet on the guide head; and FIG. 10 is a timing diagram illustrating the operation of the various component mechanisms with respect to each other during a transfer of an uncased diode from the second rack into the first rack.

Detailed description

Figure 2:
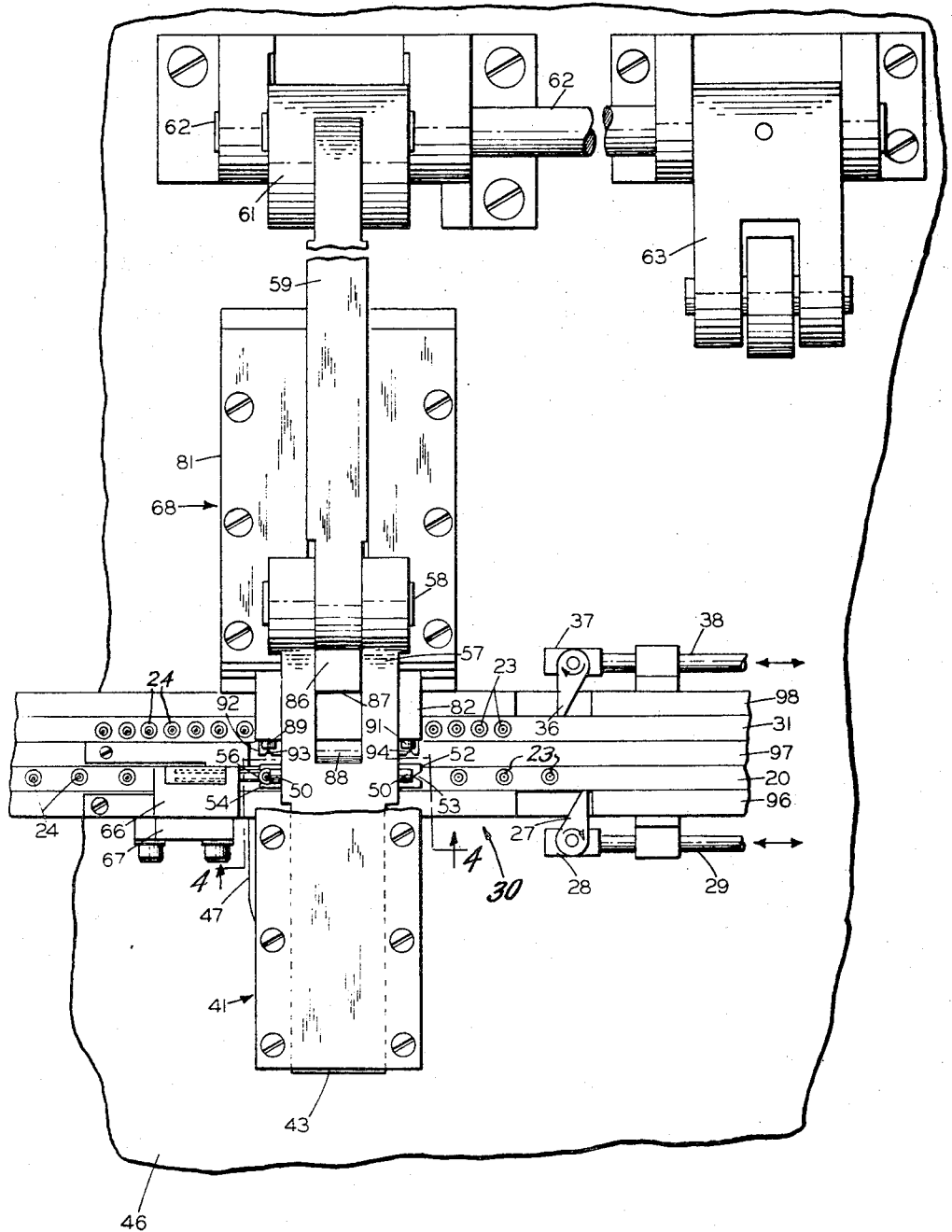
FIG. 2 is a top plan view of a machine for loading and unloading racks of the type shown in FIG. 1, embodying the principles of the present invention.

Referring first to FIG. 1, there is shown a rack or carrier 20 having a bus bar 21 mounted on the top surface. A series of apertures or bores 22 extend through the bus bar 21 into the rack 20 to receive leads extending from either uncased diodes 23 or cased diodes 24, each of which has paramagnetic leads and other paramagnetic portions, such as platforms or cases. One side of the rack 20 is provided with a plurality of slots to form teeth 26 which may be engaged by a spring-urged pawl 27 to successively advance or index the rack. The pawl 27 is mounted on a slider 28 attached to a rod 29 that is reciprocated by a cam (not shown). As the rod 29 moves to the right, the spring urges the pawl 27 to engage one of the teeth 26 to advance the rack 20 one increment, the distance between successive apertures. Upon leftward movement of the push rod 29, the spring-urged pawl rides to the left and over the next tooth to move into the next slot to engage this tooth.

Referring to FIG. 2, the rack 20 is shown in position to be advanced into the unloading and loading machine or apparatus 30. A second rack 31 is also advanced into the machine, but in an opposite direction. This second rack 31 is identical to rack 20 except that it does not have a bus bar mounted on the top surface (see also FIG. 9). It will be noted from FIG. 9 that each aperture 32 formed in the rack 31 is of a depth to support a depending lead 33 so that the body portion of the diode is held above the top surface of the rack 31, a distance equal to approximately the thickness of the bus bar 21. When a diode is inserted in the aperture 22 of the rack 20, the body portion of the diode will rest on bus bar 21.

Referring again to FIG. 2, there is shown a second spring biased pawl 36 positioned to engage teeth on the side of the rack 31 to advance this rack toward the left. Again the pawl 36 is mounted on a slider 37 attached to a push rod 38, which may be reciprocated by a cam mechanism (not shown).

In general, the rack 31 acts as a holder and advances uncased or unassembled diodes 23 into the machine 30 where they are transferred into the rack 20. The rack 20 advances to the right to move the uncased diodes into case welding machines which may be of the type shown in applicant's copending application, Ser. No. 327,971, filed Dec. 4, 1963, which has matured into Patent No. 3,341,-682, and a patent to C. R. Fegley No. 3,294,948, entitled Automatic Resistance Welding Machine. These machines function to assemble casings or caps on the diodes, which casings may be subsequently sealed to complete the assembly of a diode. The rack 20 also functions during its movement toward the right to advance cased diodes from the welding machines into the transfer machine 30 whereat the cased and sealed diodes are lifted, transferred and inserted into empty apertures formed in the rack 31.

*Transfer head*

Figure 6:
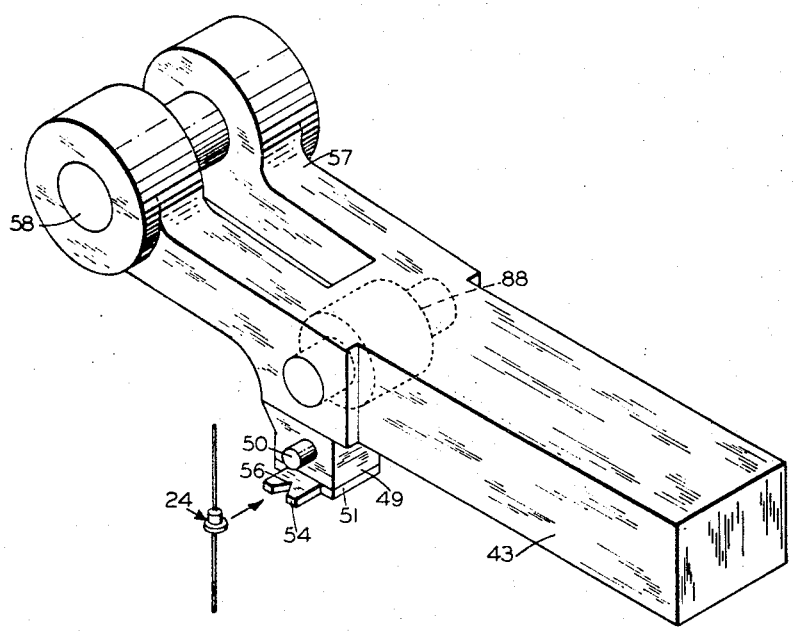
FIG. 6 is a perspective view of a slide in the transfer head which is utilized to effectuate the transfer of a diode from one rack into another.

Referring now to FIGS. 5 and 6, there is shown a transfer head generally designated by the reference numeral 41. This transfer head includes a slide housing 42 supporting a slide 43 for reciprocating movement in a horizontal direction. The slide housing 42 is attached to a push rod 44 extending through a base plate 46 and a guide bearing 47. The push rod, in turn, may be reciprocated by a suitable cam mechanism (not shown).

Figure 7:
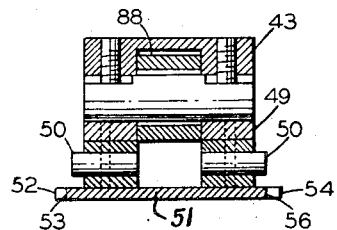
FIG. 7 is a sectional view taken along line 7—7 of FIG. 5 showing a two jaw member and a pair of magnets for holding either cased or uncased diodes on the transfer head.
Figure 8:
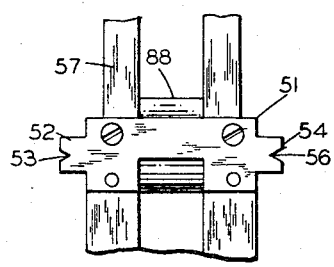
FIG. 8 is a bottom view of the transfer jaw member shown in FIG. 7.

As best illustrated in FIGS. 6 and 7, the slide has a depending section 49, which supports bar magnets 50—50 and provides a mounting for a jaw member 51 (see also FIG. 8). The jaw member 51 comprises a left hand projecting bifurcation 52 spanning a slot 53 to receive uncased diodes 23. The jaw member 51 also comprises a right hand projecting bifurcation 54 spanning a slot 56 to receive cased diodes 24.

In order to impart a reciprocating movement to the slide 43 to effectuate the transfer of diodes from one rack to another, the slide has a projecting clevis 57 (see FIG. 5) through which is journaled a pin 58 that connects a pull bar 59 to the clevis 57 and the slide 43. The pull bar 59 is pivotally connected to the lever arm 61 attached to a pivot shaft 62. Also attached to pivot shaft 62 is a link 63 pivotally connected to a push rod 64 adapted to be reciprocated by a cam mechanism (not shown).

It may be appreciated that the impartation of reciprocating movement to the push rod 44 effectuates an up and down vertical movement of the transfer head 41 and the slide 43, and that the impartation of reciprocating movement to the push rod 64 will effectuate a horizontal reciprocating movement to the slide 43. It is the simple combination of the vertical reciprocating motion and the horizontal reciprocating motion of the slide 43 that is utilized to effectuate a transfer of a diode from one rack into the other.

Attention is directed to FIG. 4 for a consideration of a device for lifting a cased diode 24 from the top surface of the bus bar 21 of the rack 20. As the rack 20 is moved toward the right, an upper lead of the cased diode 24 is attracted by a permanent magnet 66 secured to a bracket 67 attached to the side of a guide channel plate 96. Also mounted on the top of the guide channel plate 96 is an inclined plate-like ramp 69, which functions to support the cased body portion of the diode 24 as it is advanced into the slot 56 formed in the jaw member 51. A cased diode 24 is shown in FIG. 5 in position to be transferred from the rack 20 into the rack 31.

*Guide head*

As best illustrated in FIGS. 3, 4 and 5, a guide head housing 68 includes a block 81 secured to the base plate 46. The top of the block is slotted to receive a slide guide head 82, which is urged toward the right as shown in FIG. 5 by a compressed spring 83 bearing against a plug 84. Bolted on the top surface of the guide head 82 is an extension bracket 85 of a bar cam arm 86 having a cam surface 87 that bears against a roller 88 extending through the base of the slot in the clevis 57. The forward surface of the guide head 82 is stepped back and bored to receive a pair of permanent magnets 89 and 91. A projecting portion 92 of the forward stepped end of the guide head is provided with a pair of V-shaped notches 93 and 94. During transfer of cased and uncased diodes between the racks, the leads extending from the diodes are trapped within the slots 53 and 54 and the V-shaped notches 93 and 94.

Still referring to FIG. 5, the guideway structure for the racks 20 and 31 is illustrated. This structure includes vertically extending guide channel plates 96, 97 and 98. The guide channel plates 96 and 97 are attached to a lower portion of a stepped support block 39 which is attached to the base plate 46 while the remaining guide channel plate 98 is attached to the upper step portion of the block 99. The stepped configuration of the block 99 is provided to compensate for the difference in the actual height of the racks 20 and 31 so that the top surfaces of these racks are laterally aligned in the loading and unloading positions within the machine 30.

*Summary of operation*

An understanding of the overall operation of the transfer machine may be enhanced by reference to FIG. 10, which graphically depicts the relative movements of the various component mechanisms. These movements may be readily imparted by simple cam mechanisms heretofore mentioned but not specifically shown in the drawings. Assume first that the left hand portion of the rack 20 shown in FIGS. 2 and 4 is loaded with a supply of cased and sealed diodes 24, and the right hand portion of the rack 31 is loaded with a supply of uncased or unassembled diodes 23. Movement is imparted to the rack 20 as illustrated by Motion Line A in FIG. 10. During each advance of the rack 20, a cased diode 24 is moved into position to be attracted and lifted from the rack by the magnet 66. The diode continues to move along with the rack because the depending lead 33 is still positioned within its associated aperture 22. Also, during each advance of the rack 20, a previously advanced diode 24 is moved along the ramp 69 and out from beneath the influence of the magnet 66. This leading diode is moved into the slot 56 formed in the bifurcated transfer jaw member 51. As the rack 20 completes its motion to deposit the diode 24 between the bifurcations 54, vertical movement is imparted to the push rod 44 to move the transfer head 41 in an upward direction (see Motion Line B and position designated 1 in schematic view FIG. 9). As the diode 24 is positioned in the slot 56, the bar magnet 50 exerts a force to hold the diode 24 between the bifurcations 54.

As the transfer head moves up, the roller 88 also moves up to permit bar cam arm 86 to move, under the urging of compressed spring 83, toward the right as viewed in FIG. 3 and as illustrated by the Motion Line C. The guide head 82, under the urging of the spring 83, moves the permanent magnet 89 into close proximity with diode 24, and the projection portion 92 advances so that the lower lead is received in notch 93. The lead is now trapped within the slot 56, and the V-shaped notch 93 (see position 2 of FIG. 9). The magnet 89 exerts an attractive force on the trailing portion of the lead 33 while the transfer head 41 moves to its topmost position. The amount of upward movement of the transfer head 41 and forward movement of the guide head 82 is illustrated in FIG. 5 by the dashed line positions of the bar cam arm 87 and the bar cam actuator roller 88. When the transfer head reaches the upper extremity of its movement, an upward motion is imparted to push rod 64 to pivot link 63 and shaft 52 which in turn pivot lever arm 61 to move pull bar 59 toward the left as viewed in FIG. 5. Movement of pull bar 59 is imparted through clevis 57 to move the slide 43 of the transfer head 41 toward the left (see position 3 of FIGURE 9). This motion is illustrated by Motion Line D, FIG. 10. As the slide 43 moves to the left, the roller 88 acts on the upper surface of the bar cam arm to push the guide head 82 toward the left. The magnet 89, together with slot 56 and notch 93, guide and position the depending lead 33 of diode 24 over an aperture formed in the rack 31.

At this time, as illustrated by Motion Line B, the push rod 44 again moves down to move the slide 43 downward. The magnet 50 acting on the diode slides the lower lead 33 relative to the now stationary magnet 89 to insert this lead in the aligned aperture (see position 4 of FIG. 9). As the slide moves down to its final position, the cam roller 88 acts on the projecting portion of the cam surface 87 to move the guide head further toward the left as clearly illustrated in Motion Line C. The projecting portion 92 of the guide head is withdrawn to provide clearance for the descending diode as it is seated in the aligned aperture during seating of the diode in the aligned aperture. The magnet 89 is also moved to substantially eliminate its attractive force on the deposited diode 24.

Motion is now imparted to the push rod 38 to move the slide block 37 and pawl 36 to advance the rack 31 toward the left as viewed in FIG. 2. This movement is illustrated by Motion Line E in FIG. 10. The deposited cased diode 24 is thus moved from within the transfer machine. The movement of the rack 31 toward the left moves an uncased diode 23 into the aligned space 53 between the bifurcations 52 of the transfer jaw member 51. At this time, as shown by Motion Line B of FIG. 10, a second reciprocation of the push rod 44 and transfer head 41 takes place. As the transfer head 41 moves up, the transfer bifurcations 52 of the jaw member 51 lifts the uncased diode 23 from the rack 31. Again the upward movement of the cam roller 88 permits the spring 83 to move the guide head 82 and bar cam arm toward the right. The magnet 91 now moves into position to exert a force on the depending lead of the diode 23 and the notch 94 is moved to trap the lead within the notch 94 and the slot 53. As the transfer head 41 moves to the upper extremity of its movement and the depending lead is clear of the rack 31, the push rod 64 is moved down to impart motion through the link 63, pivot shaft 62, lever arm 61, pull bar 59 and the pin 51 to move the clevis 57 and the slide 43 toward the right. This movement is accompanied by a movement of the guide head 82 under the urging of the spring 83 which tends to move the bar cam arm 86 to follow the cam roller 88.

Upon completion of movement of the transfer slide 43 toward the right, depending lead of the diode 23 will be positioned over an aperture in the rack 20. Now, the transfer head 41 moves down to insert the depending lead into an aligned aperture 22. Downward movement of the roller 88 again acts on the projecting portion of cam surface 87 to move the guide head 82 toward the left as viewed in FIG. 5, thus removing the projecting portion 92 from the path of movement of the diode and substantially reducing the effective magnetic force on the deposited diode. Next, a subsequent movement of the rack 20 as illustrated by Motion Line A will move the rack in a rightward direction to withdraw the deposited uncased diode 23 from between the bifurcation 52 of the jaw member 51. The machine is now in condition to exercise another cycle of operation.

The above-described arrangement of mechanisms and construction of elemental parts are simply illustrative of an application of the principles of an invention, and many other modifications and changes may be made without departing from the invention.

What is claimed is:

1. In a machine for transferring articles from a first carrier to a second carrier and for transferring articles from the second carrier to the first carrier, a transfer head having a pair of means for holding a pair of articles, the first of which is empty while the other holds an article, means for advancing the first carrier to move an article into a first of said holding means while advancing a second article from said second holding means, means for moving said transfer head to deposit the article in the first holding means on said second carrier, and means for advancing the second carrier to move an article into said second holding means while the article deposited in said second carrier is moved from said first holding means.

2. In an article transfer apparatus for moving an article from a first article holder into a second article holder, a transfer head mounted for movement from a position over said first article holder to a position over said second article holder to transfer said article from the first article holder into said second article holder, a guide means mounted for movement into a position adjacent said first article holder, means for urging said guide means into said position adjacent said first article holder to guide an article moved by said transfer head, means on said transfer head cooperating with said guide means for holding said guide means against said urging means in a position spaced from said first article holder, and means for moving said transfer head away from said first article holder and then to a position over said second article holder and for moving said cooperating means to release said guide means to move into said position adjacent said first article holder to guide an article moved by transfer head into said second article holder.

3. In article transfer apparatus as defined in claim 2 wherein said guide means includes, a slide means having a cam bar which controls the extent of movement of said slide, and said transfer head includes a roller cooperating with said cam bar.

4. In an article transfer apparatus as defined in claim 3 wherein the slide means includes, a projecting section having an end slot for guiding the article moved by said transfer head.

5. In an article transfer apparatus as defined in claim 4 wherein the transfer head includes, a jaw member having a slot for receiving said article and which is positioned at a right angle with respect to said end slot in said guide means.

6. In an article transfer device apparatus as defined in claim 5 wherein both the guide means and the transfer head include magnetic means for attracting a paramagnetic article positioned in said slots.

7. In an apparatus for unloading and loading a rack having a plurality of aligned article receiving positions, a jaw member having a pair of oppositely disposed article receiving means, means for movably mounting said jaw member to initially position said pair of article receiving means over said rack to receive a first article from and to deposit a second article on said rack, means for advancing said rack to move a first article into a first of said article receiving means while moving a second article from the other article receiving means, and means for moving said jaw member to move said article receiving means to remove the first article from said rack and to position said second article receiving means to receive another article.

8. In an apparatus as defined in claim 7 wherein magnetic means are associated with said jaw member for magnetically holding said articles in said article receiving means.

9. In an apparatus as defined in claim 7 wherein means are provided for positioning a second rack to receive the first article removed by said jaw member, and means are rendered effective upon receipt of said first article in said second rack for advancing said second rack to move another article into said second article receiving means.

10. In an apparatus as defined in claim 7 wherein said jaw member comprises a flat plate having oppositely extending bifurcations to define a pair of article receiving slots.

11. In an apparatus for transferring a paramagnetic article from a first carrier to a second carrier, a transfer device having a magnet projecting toward an article held in said first carrier, means mounting said transfer device for vertical and horizontal movement, means for advancing the first carrier to move the article into position to be held by said first magnet, means operative upon advance of the first carrier for vertically reciprocating the transfer device to lift the article from the carrier, a guide device mounted for horizontal movement and having a second magnet projecting toward an article held by said first magnet, means rendered effective during upward vertical movement of said transfer device for advancing said guide device to move said second magnet to attract said article, means operated upon said transfer device completing its upward vertical movement for horizontally moving said transfer device and said guide device to position said article over said second carrier whereupon downward movement of said transfer device deposits said article on said second carrier.

12. In a device for removing a first article from a first carrier and loading it onto a second carrier, and for removing a second article on said second carrier and loading it onto the first carrier, a transfer device having oppositely disposed means interposed between articles on said carriers for receiving and holding said articles, means mounting said transfer device for vertical and horizontal movement, means for advancing the first carrier to move a first article into a first of said article holding means, means for imparting two vertical reciprocating movements to said transfer device a first upward movement lifting said first article, means rendered effective upon said transfer device reaching each upper limit of said reciprocating movements for imparting a forward horizontal movement at the completion of said first upward movement of the transfer device and then a reverse horizontal movement to said transfer device at the completion of the second upward movement of the transfer device to move said first article over said second carrier at the start of the first downward movement of said transfer device whereafter the first downward movement of said transfer device deposits said first article onto said second carrier, and means rendered effective upon completion of said first downward movement of said first transfer device for imparting a movement to said second carrier to move said first article from said first holding means and to move said second article into the other holding means, whereupon the second vertical reciprocation and horizontal return of said transfer device deposits said second article on said first carrier.

References Cited

UNITED STATES PATENTS 3,104,457  9/1963  Burroughs _____ 29—203
3,286,740  11/1966  Fuchs _____ 214—301 X GERALD M. FORLENZA, *Primary Examiner.*

G. F. ABRAHAM, *Assistant Examiner.*